(12) United States Patent
Bailey

(10) Patent No.: US 6,374,535 B1
(45) Date of Patent: Apr. 23, 2002

(54) SWIMMING ACTION FISHING LURE AND METHOD

(76) Inventor: David M. Bailey, 1170 Brookview Station Rd., Castleton, NY (US) 12033

( * ) Notice: Subject to any disclaimer, the term of this patent is extended or adjusted under 35 U.S.C. 154(b) by 0 days.

(21) Appl. No.: 09/309,475

(22) Filed: May 10, 1999

Related U.S. Application Data

(60) Provisional application No. 60/084,904, filed on May 11, 1998.

(51) Int. Cl.$^7$ .......................... A01K 85/10; A01K 85/16
(52) U.S. Cl. ...................................... 43/42.11; 43/42.47
(58) Field of Search .................... 43/42.09, 42.11, 43/42.13, 42.14, 42.45, 42.47, 42.48; D22/129–131

(56) References Cited

U.S. PATENT DOCUMENTS

| | | | | | |
|---|---|---|---|---|---|
| 1,315,408 | A | * | 9/1919 | Rabbeth | 43/42.05 |
| 1,707,407 | A | * | 4/1929 | Miles | 43/42.16 |
| 2,025,270 | A | * | 12/1935 | Chaney | 43/42.47 |
| 2,107,436 | A | * | 2/1938 | Flanagan | 43/42.13 |
| 2,159,230 | A | * | 5/1939 | Sage | 43/42.48 |
| 2,241,767 | A | * | 5/1941 | Cullerton | 43/42.13 |
| 2,499,718 | A | * | 3/1950 | Boshears | 43/42.47 |
| 2,523,831 | A | * | 9/1950 | Koski | 43/42.15 |
| 2,549,458 | A | * | 4/1951 | Grimm | 43/42.13 |
| 2,578,532 | A | * | 12/1951 | Forsberg | 43/42.48 |
| 2,621,438 | A | * | 12/1952 | Helin | 43/42.48 |
| 2,817,181 | A | * | 12/1957 | Bartlett | 43/42.45 |
| 2,829,462 | A | * | 4/1958 | Stokes | 43/42.48 |
| 2,866,292 | A | * | 12/1958 | Busch | 43/42.48 |
| 3,579,892 | A | * | 5/1971 | Olvey, Sr. | 43/42.11 |
| 3,702,035 | A | * | 11/1972 | Pope | 43/42.47 |
| D247,304 | S | * | 2/1978 | Pruitt | D22/133 |
| 4,121,366 | A | * | 10/1978 | McClellan | 43/42.09 |
| D250,655 | S | * | 12/1978 | Parke | D22/133 |
| 4,163,338 | A | * | 8/1979 | Lucarini | 43/42.17 |
| D254,026 | S | * | 1/1980 | Parker | D22/133 |
| 4,229,899 | A | * | 10/1980 | McGahee | 43/42.09 |
| D270,176 | S | * | 8/1983 | Williams, Jr. | D22/133 |
| 4,402,155 | A | * | 9/1983 | Mumma | 43/42.09 |
| 4,432,156 | A | * | 2/1984 | Gowing | 43/42.31 |
| 4,445,294 | A | * | 5/1984 | Gowing | 43/42.47 |
| 4,495,722 | A | * | 1/1985 | Hess et al. | 43/42.39 |
| D279,209 | S | * | 6/1985 | Hevrin | D22/130 |
| 4,581,841 | A | * | 4/1986 | Gish | 43/26.2 |
| 4,617,753 | A | * | 10/1986 | Pauley et al. | 43/42.19 |
| 4,730,410 | A | * | 3/1988 | Sobieniak | 43/42.19 |
| 4,733,491 | A | * | 3/1988 | Wilson et al. | 43/42.45 |
| 4,739,576 | A | * | 4/1988 | Davis | 43/42.47 |
| D296,811 | S | * | 7/1988 | Cordell, Jr. | D22/133 |
| 4,796,379 | A | * | 1/1989 | Rabideau | 43/42.48 |
| 4,815,229 | A | * | 3/1989 | Nicholson, III | 43/42.47 |
| 4,823,500 | A | * | 4/1989 | Shindeldecker | 43/42.13 |
| 4,860,486 | A | * | 8/1989 | Vanderplow | 43/42.19 |
| 4,998,371 | A | * | 3/1991 | Driesel | 43/42.16 |
| 4,999,942 | A | * | 3/1991 | Gills | 43/42.45 |
| 5,042,189 | A | * | 8/1991 | Bailey | 43/42.09 |
| 5,119,581 | A | * | 6/1992 | Rudolph | 43/42.22 |
| 5,133,147 | A | * | 7/1992 | Benard | 43/42.21 |
| 5,175,955 | A | * | 1/1993 | Wilson et al. | 43/42.36 |
| 5,182,875 | A | * | 2/1993 | Righetti | 43/42.24 |
| 5,189,825 | A | * | 3/1993 | Stewart | 43/42.47 |
| 5,197,221 | A | * | 3/1993 | Kresl | 43/42.47 |
| 5,301,453 | A | * | 4/1994 | Terrill | 43/42.09 |
| 5,369,906 | A | * | 12/1994 | Anterni | 43/42.09 |

(List continued on next page.)

*Primary Examiner*—Darren W. Ark
(74) *Attorney, Agent, or Firm*—Jay R. Yablon

(57) ABSTRACT

A fishing lure comprising a crankbait or similar body member to which both a spinner and a hook are attached, provides the crankbait with a realistic swimming motion. In particular, the spinning of the spinner, coupled with its positioning on the crankbait, imparts an oscillating, swimming-like motion to the crankbait, which greatly enhances the luring of fish. This is in addition to the benefits already derived by virtue of the spinning of the spinner.

11 Claims, 2 Drawing Sheets

U.S. PATENT DOCUMENTS 5,381,623 A * 1/1995 Crisp ........................ 43/42.43
5,394,636 A * 3/1995 Rabideau ................... 43/42.13
5,412,899 A * 5/1995 Reboul ...................... 43/42.13
5,412,901 A * 5/1995 Matinez .................... 43/42.22
5,595,015 A * 1/1997 Jensen ....................... 43/42.06
5,600,916 A * 2/1997 Smith ........................ 43/42.47
5,638,631 A * 6/1997 Guerri et al. .............. 43/42.33
5,647,163 A * 7/1997 Gorney ...................... 43/42.13

* cited by examiner

SWIMMING ACTION FISHING LURE AND METHOD

CROSS-REFERENCE TO RELATED APPLICATIONS

This application claims the benefit of U.S. Provisional Application No. 60/084,904, filed May 11, 1998.

FIELD OF THE INVENTION

This invention relates generally to the area of fishing lures, and more specifically, to enabling a fishing lure to move in a manner that realistically approximates the motion of a swimming fish and therefore enhances its ability to attract and catch real fish.

BACKGROUND OF THE INVENTION

Fishing is a very popular pastime in the Unites States and throughout the world. Fishermen (and women) are always searching lo for a way to gain an extra advantage in attracting and catching fish. One of the key components of fishing equipment that affects the ability to attract and catch fish is the lure. There are of course many varieties, shapes, sizes and configurations of fishing lure with varying weight balances according to the type of fish being pursued and the conditions under which the fishing is to occur.

Some of these lures utilize a so-called "crankbait." This is essentially a solid body composed, for example, of wood, plastic, light metal, and/or plastics mixed with other components. It is fashioned into the general shape of a fish, and is often colored and otherwise given surface design characteristics that make it closely resemble a fish. The object, of course, is to fool a real fish into believing that the crankbait, when moving through the water under tow from the fishing line, is in fact another fish. Thus, ideally, the fish will follow the crankbait and bite onto one or more hooks typically attached to the crankbait.

Other lures often employ a so-called "spinner," or, alternatively, "spoon." A spinner, like a crankbait, is designed generally to appear like a fish. However, the spinner has a fairly flat, blade-like (or spoon-like) configuration, and is attached to the lure in such a manner that when moved through the water, it will actually spin in a manner well known in the art. The spinning of the spinner, and the reflection of light off of the spinner while it spins, causes the fish to see a flashing object generally shaped like a fish, hopefully to pursue that object, and again, to bite.

The prior art is indeed crowded with all sorts of lure configurations, each designed to provide some particular advantage to the fisherman who employs it.

Much of the prior art employing solid body members such as a crankbait, combines the crankbait with two fishing hooks attached thereto and suspended therefrom. Thus, for example, U.S. Pat. Nos. 4,229,899; 4,402,155; 4,445,294; 4,733,491; 4,739,576; 4,999,942; 5,042,189; 5,182,875; 5,301,453; 5,369,906; 5,600,916; and 5,638,631; as well as, for example, U.S. Design Patents D247,304; D250,655; D254,026; D270,176; and D 296,811 can each be commonly characterized as a fishing lure comprising a solid body with two fishing hooks suspended from the solid body. Generally, one hook (a rear hook) is located at the rear of the body with respect to the location where the fishing line is attached, while the other hook (a front hook) is located somewhere in the midsection of the body. However, in all of these cases, there is nothing to impart the body with a "swimming" movement that would cause it to more closely resemble a live, swimming fish, and therefore to attract live fish who are misled into believing that the body is itself a real fish. It is to be noted that none of these configurations includes or suggests a spinner element.

Other prior art, such as U.S. Pat. Nos. 4,432,156; 4,495,722; 204,581,841; 4,796,379; 5,119,581; 5,175,955; 5,197,221; and 5,381,623 can each be commonly characterized as a fishing lure comprising a solid body with a single fishing hook attached to and suspended from the solid body, generally near the rear of the body. While these patents are generally designed to provide some form of motion to the body, this motion is awkwardly-imparted by some element that is unique to the particular body, rather than by a modular element that is commonly available to all fishermen as standard fishing equipment. And, it appears that the motion of these lures can certainly be improved upon. It is to be noted once again, that none of these configurations includes or suggests a spinner element.

Spinners, on the other hand, are typically attached directly to a rigid spindle attached to the fishing line, with the fishing hook placed several inches behind the spinner and attached to the same spindle, and perhaps, with some intervening elements. Thus, for example, U.S. Pat. Nos. 4,617,753; 4,860,486; 5,133,147; 5,412,899; 5,412,901; and 5,647,163 can commonly be characterized as fishing lures comprising a spindle with a spinner attached to a forward section of the spindle and a hook attached to an end section of the spindle. U.S. Pat. Nos. 4,121,366; 4,163,338; 4,730,410; 4,823,500; 4,998,371; 5,394,636 and 5,595,015 are similarly characterized, but also appear to contain one or more additional elements attached to the spindle between the spinner and the hook. In this configuration, the spinner is located in such a position that it has little if any impact on the overall motion of the lure, and certainly, for those patents with additional elements, the spinner is not directly attached to those elements, and is not utilized to cause those elements to oscillate in the manner of a swimming fish.

OBJECTS OF THE INVENTION

It would be desirable therefore, to have available a fishing lure with a solid, fish-like body (such as a crankbait) that oscillates in substantially the same manner as a swimming fish, thereby serving to better lure real fish into biting.

It would further be desirable, to impart this oscillating (swimming) motion to the crankbait using a readily available modular element attaching directly to the crankbait.

It would further be desirable to make more effective use of the motion generated by a spinner, so as to impart such a swimming motion to the associated crankbait.

SUMMARY OF THE INVENTION

The invention disclosed herein improves the prior art in a novel and non-obvious manner, utilizing the spinning motion of a standard, modular spinner, to impart extra action to a crankbait or similar body component, thereby making the crankbait oscillate so as to look substantially like a live, swimming fish.

In particular, a standard spinner module is attached to the crankbait in place of the front hook, in substantially the same location that the front hook is ordinarily attached for the two-hook configurations earlier described. The rear hook is attached to the crankbait in its usual place. In contrast to the spindle/spinner/hook configurations earlier described, rather than being attached to a spindle (which may or may not have intervening components), both the spinner and the hook are directly attached to the crankbait.

As a result of this novel combination of commonly-available fishing elements, the spinner causes the crankbait to oscillate in a manner closely resembling a swimming fish, in addition to attracting fish in its own right by virtue of its own spinning motion. That is, this invention takes advantage of the spinning motion of the spinner not only in its own right, but also to impart a realistic swimming motion a crankbait or similar body member. The result is that fish are lured and caught much more effectively.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
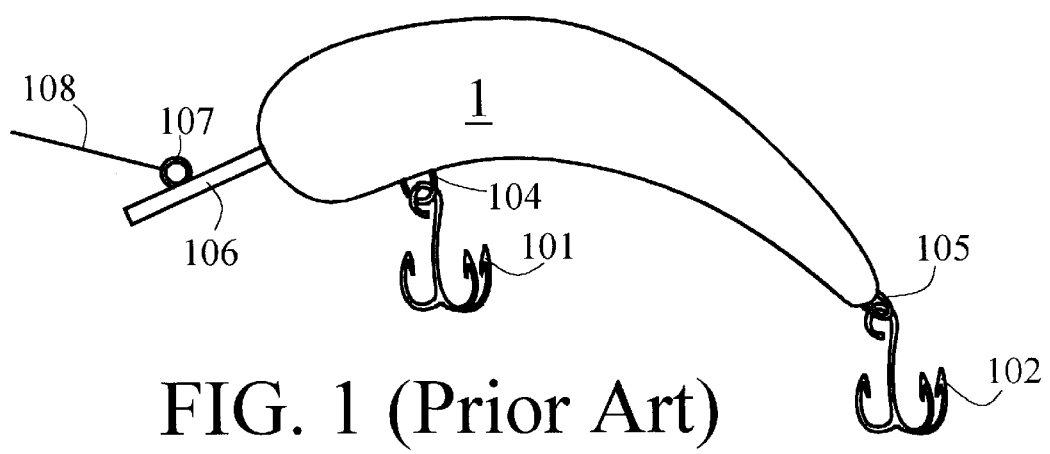
FIG. 1 is a plan view illustrating a lure including a crankbait-type body with two hooks attached thereto, in the configuration predominantly used in the prior art.

FIG. 1 illustrates the prior art described earlier in which a solid body member 1 such as a crankbait is combined with both a forward hook 101 and a rear (tail) hook 102 in accordance with widely-practiced fishing art. Forward hook 101 is mounted to solid body member 1 with forward body mounting means 104, while rear hook 102 is mounted to solid body member 1 with rear body mounting means 105, as is well-known in the art. Mounts 104 and 105 can vary widely, and many ways of implementing these mounts are well-known in the art. Also illustrated attached to the front of body member 1 is a bill 106 (also commonly referred to as a runner), and a bill-to-line attachment means 107 such the illustrated eyelet to which one ordinarily attaches a fishing line 108. Bill 106 is typically flat as viewed from the side and wide as viewed from the top, so as to provide stability to body member 101 as said body member is pulled through the water. Bill 106 may also have additional stabilizing features. Indeed, a wide variety of bill 106 and mount 104, 105 configurations are in fact well-known in the art, and such variations in bill configuration and mounting means are independent of and do not in any way impact the invention as disclosed herein.

Figure 2:
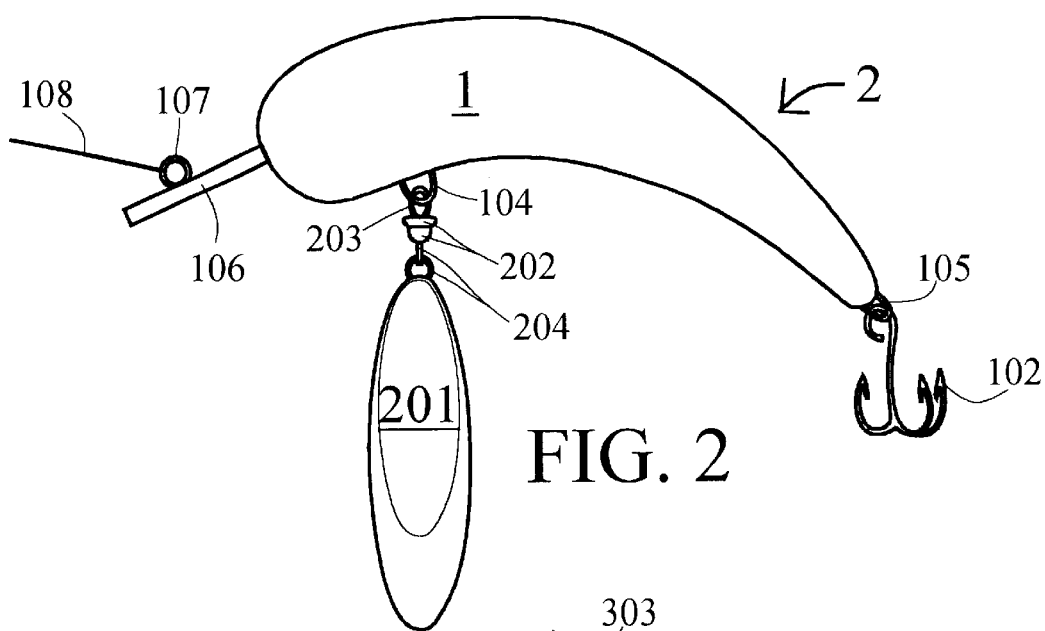
FIG. 2 is a plan view illustrating a lure in which a spinner replaces the forward hook of the prior art, in accordance with a preferred embodiment of the invention.

FIG. 2 illustrates the preferred embodiment of the invention in which a spinner blade 201 is attached directly to forward body mount 104 of solid body member 1 in place of forward hook 101. In particular, a swivel means 202 is connected at a first end to forward body mount 104 with a swivel-to-mount attachment means 203 such as the illustrated eyelet. At a second end pivoting with respect to said first end, it is further attached to spinner blade 201 via a swivel-to-spinner attachment means 204 such as is illustrated. Rear hook 102 continues to be attached to solid body member 1 via rear body mount 105 in the usual manner, and the entire lure assembly 2 is attached to fishing line 108 via bill 106 and bill-to-line attachment means 107 in the usual manner. The depiction of a particular spinner blade 201, swivel means 202, swivel-to-mount attachment means 203, swivel-to-spinner attachment means 204, and forward body mount 104 in FIG. 2 is for illustration only, and does not in any limit this disclosure and its associated claims. Known in the art are a wide variety of spinners and means of attaching said spinner to fishing gear so as to enable the spinner to spin about its longitudinal axis. The combination of any spinner 201 with a solid body member 1 in substantially the manner shown herein is considered to be within the scope of this disclosure and its associated claims. It is also understood that a wide variety fishing hooks are known in the art, any of which can be suitably employed as rear hook 102 within the scope of this invention. This includes hooks with and without live bait, hooks with varying numbers of prongs and prong configurations, and hooks with or without added attractive elements such as so-called "rooster tails."

Figure 3:
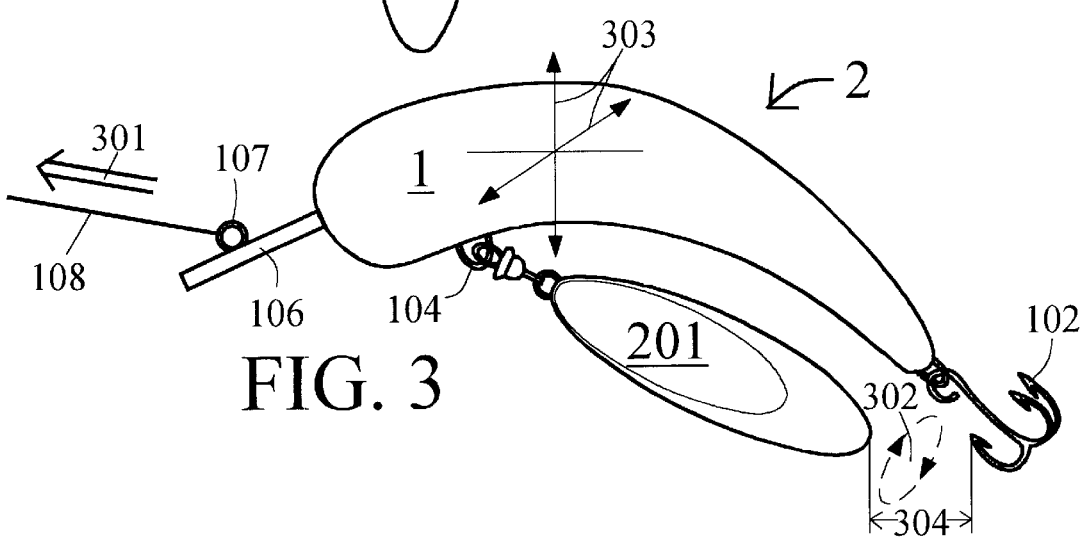
FIG. 3 is a plan view illustrating how the spinner and the crankbait-type body move to provide a more realistic swimming motion, as the entire lure is moved through the water.

As now illustrated in FIG. 3, when lure assembly 2 is pulled through the water by line 108 attached (107) to bill 106 in the general direction indicated by arrow 301, both spinner blade 201 and rear hook 102 will generally tend toward the rear portion of body member 1 as shown, due to rearward drag from the water. Additionally, the spinner will be caused to spin generally as illustrated by arrows 302 (or counterclockwise for reversed orientation), in the manner known in the art. However, spinner blade 201, by virtue of its attachment directly to solid body 1 via forward body mount 104, also pulls upon solid body 1, causing solid body 1 to move with a mixture of side to side, and up and down motion components with respect to its forward motion 301, as illustrated generally by the two degrees of freedom in the plane normal to movement of lure assembly 2 through the water, shown by 303. This extra motion imparted directly by spinner 201 to body 1, causes body 1 to appear as though it is a live, swimming fish, which in turn serves to more effectively lure real, live fish to bite on rear hook 102 and be caught.

The position for attaching spinner 201 to body 1 is ideally chosen such that there is a small, positive distance 304 between the back of spinner 201 and the prongs of rear hook 102 as the lure 2 is pulled (301) through the water in the manner illustrated in FIG. 3. Additionally, this spinner attachment position should be forward enough on body 1 so as to impart the desired motion characteristics to body 1 as a whole. Thus, the spinner attachment point can and will vary, based on such factors as the size, shape, weight and weight distribution of body 1, length of spinner 201, length of rear hook 102, etc. It is understood, however, that while spinner 201 is illustrated herein as being attached to the midsection of body 1 perhaps about 60% to 80% of the way toward the front of, and away from the rear of, body 1, that the attachment of spinner 201 anywhere upon the midsection of body 1, ranging from about 40% to 90%, and even from about 5% to 95% of the way toward the front of body 1, and, indeed, anywhere on the body so as to introduce appropriate motion 303, is considered to be within the scope of this disclosure and its associated claims.

Figure 4:
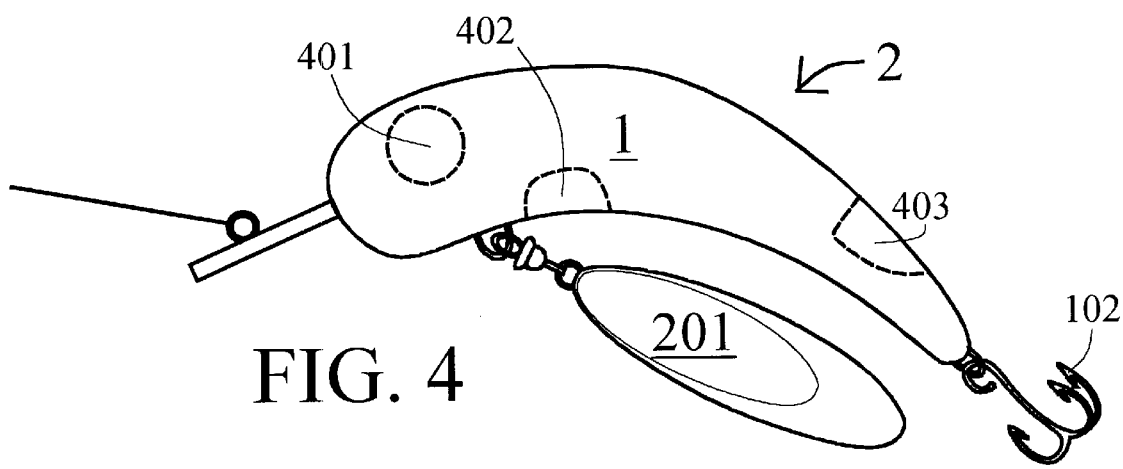
FIGS. 4 through 6 illustrate several options for placing weights within the lure body, so as to attain differing motions and effects depending on the desired use.
Figure 5:
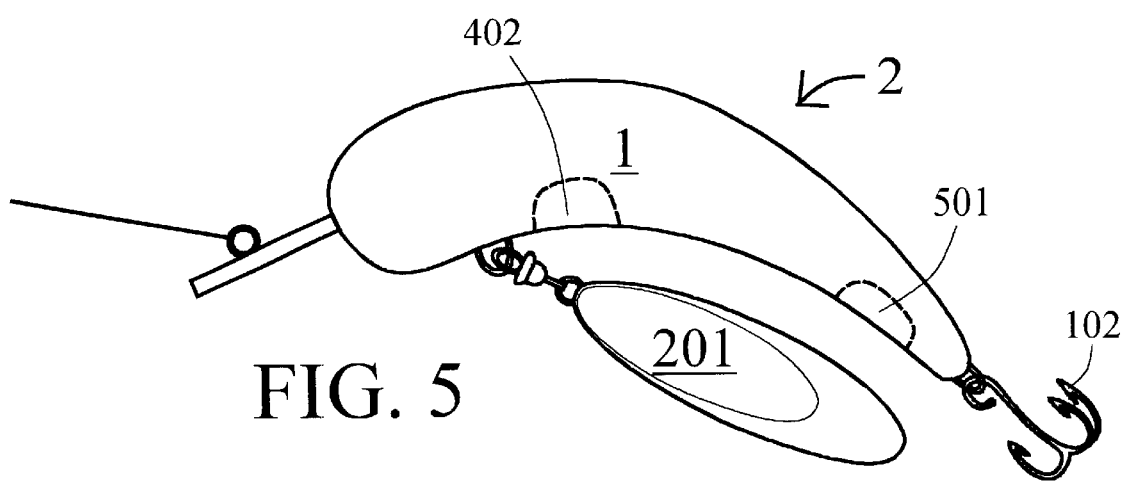
Figure 6:
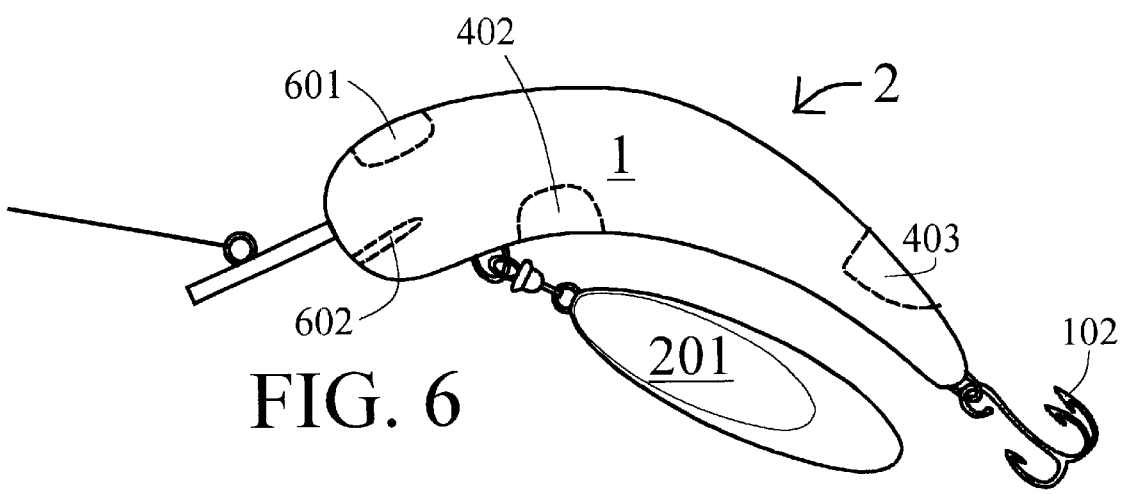

FIGS. 4 through 6 show examples of how to balance the weighting of lure 2, particularly body member 1, to achieve differing effects for varying situations. FIG. 4 illustrates a weight distribution for a "deep running" lure designed to stay well below the surface for catching fish at greater depth. For discussion, if body 1 is roughly shaped like a fish, then a pair of weights (weighting elements) is placed substantially near region 401 on each side of the "head" of body 1, underneath the location of the "eyes." Other weights are located in the lower center of the body substantially near region 402, and at the tail along the upper part of the body substantially near region 403.

The weight distributions of FIGS. 5 and 6 provide surface lures that will ride at or near the surface, and be more suitable for shallow-water fish. In FIG. 5, a weight remains substantially near region 402. But the other weights of FIG. 4 are removed, and replaced by a weight near the tail, on the lower part of the body, substantially near region 501. In FIG. 6, the weighting 402 remains, in addition to the aforesaid weighting 403. Also added is a single weight located at the top of the head substantially near region 601, and a weight near at the "mouth" of body 1, substantially near region 602. These weighting configurations are illustrative of configurations that have been tested and demonstrated to provide the desired swimming motion effect when used in combination with body 1 and spinner 201 as illustrated and disclosed above. This does not preclude the use of other suitable weighting configurations as well, or the absence of any such weighting, within the scope of this invention and its associated claims. Additionally, reference herein to a "weight" is understood to encompass one weight, or a plurality of weights closely positioned to one another so as to provide a single "weighting."

The invention heretofore disclosed imparts a realistic swimming motion to a crankbait or similar lure body, and does so without requiring awkward modification (or indeed, any modification at all) to the lure body. Indeed, by utilizing a spinner element well-known in the art directly in combination with a crankbait and attaching that spinner directly to the body of the crankbait, this swimming motion is achieved using only known modular art elements, combined in a novel, non-obvious manner. The very large number of prior art lures that use a crankbait with two hooks, or that awkwardly modify the crankbait body to add motion, or that utilize spinner attached to a spindle, all teach directly away from the much simpler, vastly improved configuration and method disclosure herein, and make clear the novelty and non-obviousness of this configuration and method.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A fishing lure assembly, comprising:
    a solid body member comprising a continuous downward bend in a longitudinally-centered axis of said solid body member and along both upper and lower surfaces of said solid body member, proximate a midsection of said solid body member, and further comprising a tapered shape that is wider and thicker at a front end of said solid body member and continuously becomes narrower and thinner toward a rear end of said solid body member such that said upper and lower surfaces of said solid body member converge together at said rear end, the front end of said solid body member comprising a convex surface extending across said longitudinally-centered axis;
    at least one spinner blade directly attached to said solid body member, centered directly beneath said solid body member and not displaced to either of two sides of said solid body member, approximately 60%–90% of the way toward a front extremity of, and away from a rear extremity of, said solid body member, with swivel means enabling said at least one spinner blade to spin substantially about a longitudinal axis of said at least one spinner blade;
    at least one rear fishing hook attached to said solid body member proximate a rear section of said solid body member; and
    a bill attached to and extending from said front end of said solid body member to provide stability to said solid body member as said solid body member is pulled through water, said bill comprising substantially flat upper and lower surfaces extending transversely from said convex surface of said front end of the solid body member and further comprising line attachment means for attaching a fishing line thereto;
        said direct attachment of said at least one spinner blade to said solid body member consisting of said swivel means connecting together said spinner blade and said solid body member;
        whereby said spinner blade causes said solid body member to oscillate in a manner more closely resembling a swimming fish when said fishing lure assembly is pulled and moved through water.

2. The fishing lure assembly of claim 1, wherein:
    said at least one spinner blade is further so-attached to said solid body member at a location such that, when said lure assembly is pulled through water to attract and catch fish, a back region of said at least one spinner blade is located a small distance in front of at least one prong of said rear fishing hook.

3. The fishing lure assembly of claim 1, wherein said solid body member is a crankbait.

4. The fishing lure assembly of claim 1, further comprising:
    a recess region defined beneath said solid body member by said narrower and thinner rear end and said downward bend; wherein:
        said at least one spinner blade is so-attached to said solid body member at a location such that when said lure assembly is pulled through water to attract and catch fish, said at least one spinner blade resides substantially in said recess region and said longitudinal axis of said at least one spinner blade is substantially parallel to said rear section of said solid body member.

5. A method for assembling a fishing lure, comprising the steps of:
    directly attaching at least one spinner blade to a solid body member of said fishing lure, centered directly beneath said solid body member and not displaced to either of two sides of said solid body member, approximately 60%–90% of the way toward a front extremity of, and away from a rear extremity of, said solid body member, using swivel means enabling said at least one spinner blade to spin substantially about a longitudinal axis of said at least one spinner blade; and
    attaching at least one rear fishing hook to said solid body member proximate a rear section of said solid body member;
    said step of directly attaching said at least one spinner blade to said solid body member further comprising omitting any elongated arm connecting together said swivel means and said solid body member; and
    said solid body member comprising a continuous downward bend in a longitudinally-centered axis of said solid body member and along both upper and lower surfaces of said solid body member, proximate a midsection of said solid body member, and further comprising a tapered shape that is wider and thicker at a front end of said solid body member and continuously becomes narrower and thinner toward a rear end of said solid body member such that said upper and lower surfaces of said solid body member converge together at said rear end, the front end of said solid body member comprising a convex surface extending across said longitudinally-centered axis; and attaching and extending a bill to and from said front end of said solid body member to provide stability to said solid body member as said solid body member is pulled through water, said bill comprising substantially flat upper and lower surfaces extending transversely from said convex surface of said front end of the solid body member and further comprising line attachment means for attaching a fishing line thereto; whereby said spinner blade causes said solid body member to oscillate in a manner more closely resembling a swimming fish when said fishing lure assembly is pulled and moved through water.

6. The method of claim 5, wherein said step of directly attaching at least one spinner blade further comprises so-attaching said at least one spinner blade to said solid body member at a location such that, when said lure is pulled through water to attract and catch fish, a back region of said at least one spinner blade is located a small distance in front of at least one prong of said rear fishing hook.

7. The method of claim 5, wherein said solid body member is a crankbait.

8. The method of claim 5, said solid body member further comprising a recess region defined beneath said solid body member by said narrower and thinner rear end and said downward bend, wherein:

said step of directly attaching at least one spinner blade further comprises so-attaching said at least one spinner blade to said solid body member at a location such that when said lure is pulled through Water to attract and catch fish, said at least one spinner blade resides substantially in said recess region and said longitudinal axis of said at least one spinner blade is substantially parallel to said rear section of said solid body member.

9. A method for luring fish, comprising the steps of:

directly attaching at least one spinner blade to a crankbait, centered directly beneath said crankbait and not displaced to either of two sides of said crankbait, approximately 60%–90% of the way toward a front extremity of, and away from a rear extremity of, said crankbait, using swivel means enabling said at least one spinner blade to spin substantially about a longitudinal axis of said at least one spinner blade;

attaching at least one rear fishing hook to said crankbait proximate a rear section of said crankbait;

pulling and moving said crankbait through water such that said at least one spinner blade spins about said longitudinal axis, and such that said spinning causes said crankbait to oscillate in a plane normal to the movement of said crankbait through said water;

said step of directly attaching said at least one spinner blade to said crankbait further comprising omitting any elongated arm connecting together said swivel means and said crankbait; and said crankbait comprising a continuous downward bend in a longitudinally-centered axis of said crankbait and along both upper and lower surfaces of said crankbait, proximate a midsection of said crankbait, and further comprising a tapered shape that is wider and thicker at a front end of said crankbait and continuously becomes narrower and thinner toward a rear end of said crankbait such that said upper and lower surfaces of said crankbait converse together at said rear end, the front end of said crankbait comprising a convex surface extending across said longitudinally-centered axis; and attaching and extending a bill to and from said front end of said crankbait to provide stability to said crankbait as said crankbait is pulled through water, said bill comprising substantially flat upper and lower surfaces extending transversely from said convex surface of said front end of the crankbait; and attaching said bill to a fishing line; whereby said spinner blade causes said crankbait to oscillate in a manner more closely resembling a swimming fish when said crankbait is pulled and moved through water.

10. The method of claim 9, said crankbait further comprising a recess region defined beneath said crankbait by said narrower arid thinner rear end and said downward bend, wherein:

said step of directly attaching at least one spinner blade further comprises so-attaching said at least one spinner blade to said crankbait at a location such that when said crankbait is pulled through water to attract and catch fish, said at least one spinner blade resides substantially in said recess region and said longitudinal axis of said at least one spinner blade is substantially parallel to said rear section of said crankbait.

11. The method of claim 9, wherein said step of directly attaching at least one spinner blade further comprises so-attched said at least one spinner blade to said crankbait at a location such that, when said crankbait is pulled through water to attract and catch fish, a back region of said at least one spinner blade is located a small distance in front of at least one prong of said rear fishing hook.

* * * * *